US008884936B2

(12) United States Patent
Maekawa (10) Patent No.: US 8,884,936 B2
(45) Date of Patent: Nov. 11, 2014

(54) DISPLAY CONTROL DEVICE, DISPLAY CONTROL METHOD, AND NON-TRANSITORY COMPUTER READABLE MEDIUM STORING PROGRAM

(75) Inventor: Takao Maekawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 486 days.

(21) Appl. No.: 13/231,239

(22) Filed: Sep. 13, 2011

(65) Prior Publication Data

US 2012/0235960 A1 Sep. 20, 2012

(30) Foreign Application Priority Data

Mar. 15, 2011 (JP) ................................ 2011-056485

(51) Int. Cl.
*G06F 3/038* (2013.01)
*G09G 5/00* (2006.01)
*G06F 3/00* (2006.01)
*H04N 1/00* (2006.01)
*H04N 1/23* (2006.01)
*H04N 1/21* (2006.01)
*G06F 3/12* (2006.01)
*G06F 9/445* (2006.01)

(52) U.S. Cl.
CPC ......... *H04N 1/00435* (2013.01); *H04N 1/2307* (2013.01); *H04N 1/00411* (2013.01); *H04N 1/00424* (2013.01); *H04N 1/00427* (2013.01); *H04N 1/00448* (2013.01); *H04N 1/00474* (2013.01); *H04N 1/00938* (2013.01); *H04N 1/2158* (2013.01); *H04N 2201/0094* (2013.01); *G06F 3/1208* (2013.01); *G06F 3/1256* (2013.01); *G06F 3/128* (2013.01); *G06F 9/44505* (2013.01)
USPC ............................................... 345/204; 710/8

(58) Field of Classification Search
CPC ..... G06F 17/00; G06F 3/1208; G06K 15/002; G06K 15/18; B41J 11/009; H04N 1/00411; H04N 1/00424; H04N 1/2307
USPC .......................................................... 345/204
See application file for complete search history.

(56) References Cited

U.S. PATENT DOCUMENTS

| 7,395,957 | B2 | 7/2008 | Satake |
| 2005/0045711 | A1 | 3/2005 | Satake |
| 2007/0013562 | A1 | 1/2007 | Nagasawa |
| 2010/0321729 | A1* | 12/2010 | Yagi .............................. 358/1.15 |

FOREIGN PATENT DOCUMENTS

| JP | 2005-079673 A | 3/2005 |
| JP | 2007-028179 A | 2/2007 |

* cited by examiner

*Primary Examiner* — Farley Abad
(74) *Attorney, Agent, or Firm* — Sughrue Mion, PLLC (57) ABSTRACT

A display control device includes: a detecting unit that detects whether an external storage device is inserted into an image forming apparatus; an analyzing unit that analyzes the type of file stored in the external storage device when the detecting unit detects that the external storage device is inserted; and a display control unit that specifies a function related to the type of file among the functions of the image forming apparatus on the basis of the analysis result of the analyzing unit and displays a display screen to which the specified function is allocated on a display unit.

10 Claims, 11 Drawing Sheets

DISPLAY CONTROL DEVICE, DISPLAY CONTROL METHOD, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2011-056485 filed Mar. 15, 2011.

BACKGROUND

Technical Field

The present invention relates to a display control device, a display control method, and a non-transitory computer readable medium storing a program.

SUMMARY

According to an aspect of the invention, there is provided a display control device including: a detecting unit that detects whether an external storage device is inserted into an image forming apparatus; an analyzing unit that analyzes the type of file stored in the external storage device when the detecting unit detects that the external storage device is inserted; and a display control unit that specifies a function related to the type of file among the functions of the image forming apparatus on the basis of the analysis result of the analyzing unit and displays a display screen to which the specified function is allocated on a display unit.

BRIEF DESCRIPTION OF THE DRAWINGS

Exemplary embodiments of the present invention will be described in detail based on the following figures, wherein.

DETAILED DESCRIPTION

Hereinafter, display control devices according to exemplary embodiments of the invention will be described with reference to the accompanying drawings.

Exemplary Embodiments (Structure)

Figure 1:
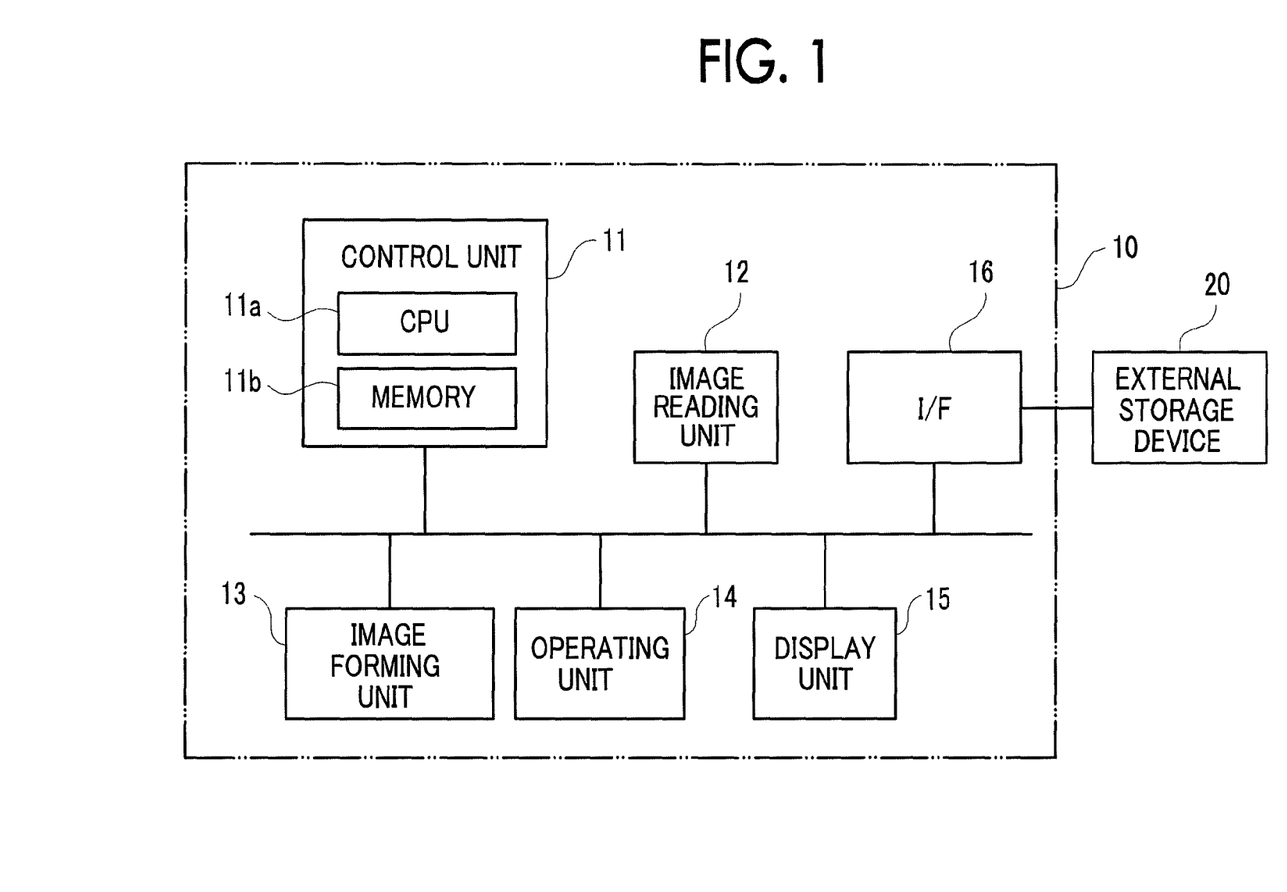
FIG. 1 is a block diagram illustrating an example of the structure of an image forming apparatus according to an exemplary embodiment.

FIG. 1 is a block diagram illustrating the structure of an image forming apparatus including a display control device according to an exemplary embodiment of the invention. As shown in FIG. 1, an image forming apparatus 10 includes a control unit 11, an image reading unit 12, an image forming unit 13, an operating unit 14, a display unit 15, and an I/F 16.

The control unit 11 includes a CPU (Central Processing Unit) 11a and a memory 11b including a ROM (Read Only Memory) and a RAM (Random Access Memory). The CPU 11a executes a control program stored in the ROM to control each unit connected to the control unit 11. The functions of the control unit 11 implemented by the execution of the control program will be described in detail below.

The image reading unit 12 includes a scanner and a sensor that detects whether a recording medium, such as a sheet, is set on a platen (image reading position) on which the recording medium is placed. The image reading unit 12 transmits a signal indicating whether the recording medium is set to the control unit 11. In addition, the image reading unit 12 optically reads an image on the recording medium and generates image data under the control of the control unit 11. The image forming unit 13 is, for example, an electrophotographic type that forms an image through, for example, a charging process, an exposure process, a development process, a transfer process, and a fixing process. The image forming unit 13 forms an image of designated image data on a sheet and discharges the sheet under the control of the control unit 11. The recording type of the image forming unit 13 is not limited to the electrophotographic type, but it may be, for example, a thermal transfer type, an inkjet type, or a dot impact type.

The operating unit 14 includes various kinds of operation buttons, such as numeric keys for designating the number of print copies, a menu button, an execution button, and a reset button, and transmits information indicating the operation received from the user to the control unit 11. The display unit 15 includes a touch panel and displays display screens related to various kinds of functions of the image forming apparatus 10 under the control of the control unit 11.

The I/F 16 is an interface that transmits to the control unit 11 a signal indicating the insertion state of an external storage device 20 when the external storage device 20 is inserted or removed and exchanges data or control signals with the inserted external storage device 20. The external storage device 20 is a removable storage device, such as a USB (Universal Serial Bus) memory or an SD memory card.

Figure 2:
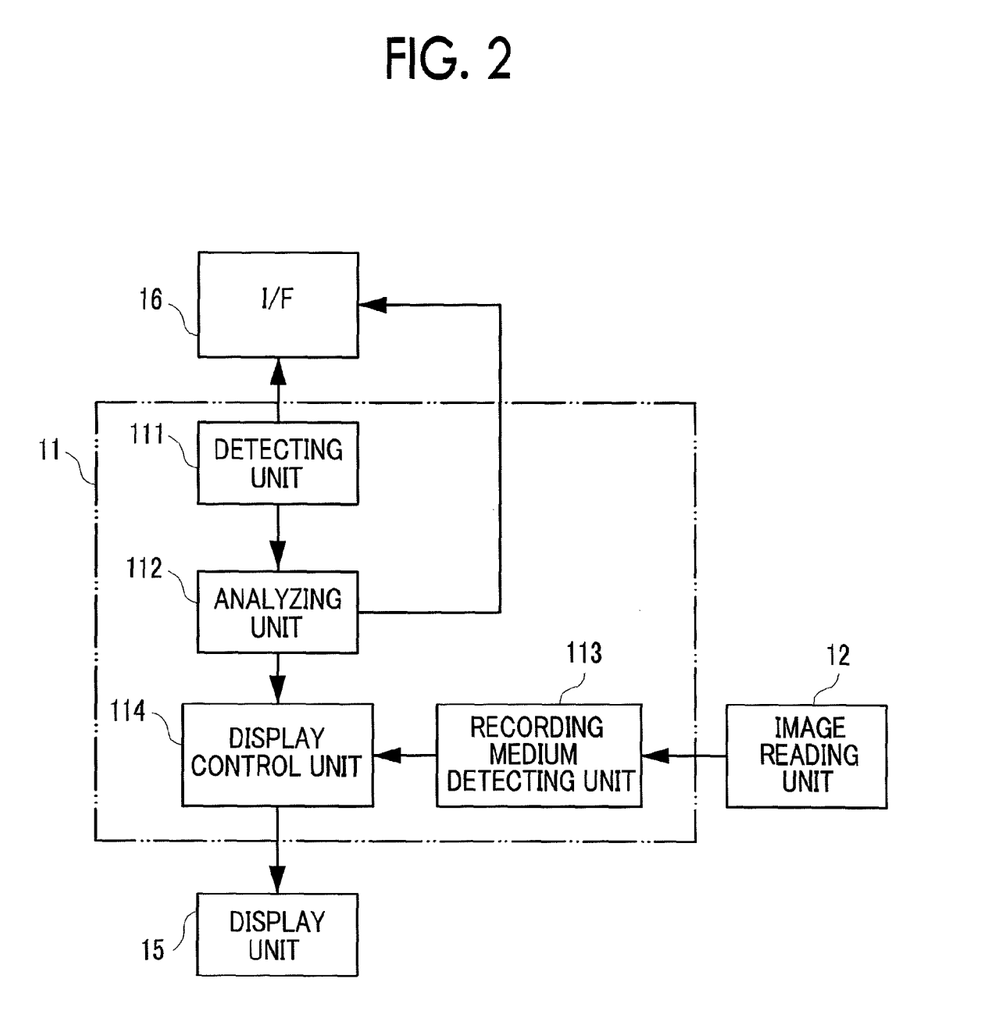
FIG. 2 is a diagram illustrating the configuration of the functions of a control unit of the image forming apparatus.

Next, the control unit 11 that implements of the functions of the display control device according to the exemplary embodiment of the invention will be described. FIG. 2 is a block diagram illustrating an example of the configuration of the functions of the control unit 11. As shown in FIG. 2, the control unit 11 includes a detecting unit 111, an analyzing unit 112, a recording medium detecting unit 113, and a display control unit 114. The detecting unit 111 is an example of a detector according to an exemplary embodiment of the invention. The detecting unit 111 acquires signals from the I/F 16 and detects whether the external storage device 20 is inserted.

The analyzing unit 112 is an example of an analyzer according to an exemplary embodiment of the invention. When the detecting unit 111 detects that the external storage device 20 is inserted into the I/F 16, the analyzing unit 112 analyzes the type of files stored in the external storage device 20 through the I/F 16. In this exemplary embodiment, for the file types, for example, a JPEG (Joint Photographic Experts Group) or TIFF (Tagged Image File Format) file in which Exif (Exchangeable image file format) meta data (for example, header information, imaging information, and thumbnail image data) is written is referred to as a photograph file, and a JPEG or TIFF file in which the Exif meta data is not written and a Word or PDF file are referred to as text files. It is determined whether a file is a photograph file on the basis of whether the Exif meta data is written. When plural types of files are stored in the external storage device 20 and the types of files are predetermined to be printed by the image forming apparatus 10, the analyzing unit 112 counts the number of files of each type. In addition, in this exemplary embodiment, files corresponding to the photograph file and the text file are printing targets of the image forming apparatus 10.

The recording medium detecting unit 113 is an example of a recording medium detector according to an exemplary embodiment of the invention. The recording medium detecting unit 113 acquires signals from the image reading unit 12 and detects whether a recording medium, such as a sheet, is set on the image reading unit 12. The display control unit 114 is an example of a display controller according to an exemplary embodiment. The display control unit 114 specifies one function of the image forming apparatus 10 on the basis of the detection result of the recording medium detecting unit 113 and the number of types of files and the number of files of each type which are analyzed by the analyzing unit 112, and displays a display screen to which the specified function is allocated on the display unit 15.

Figure 3:
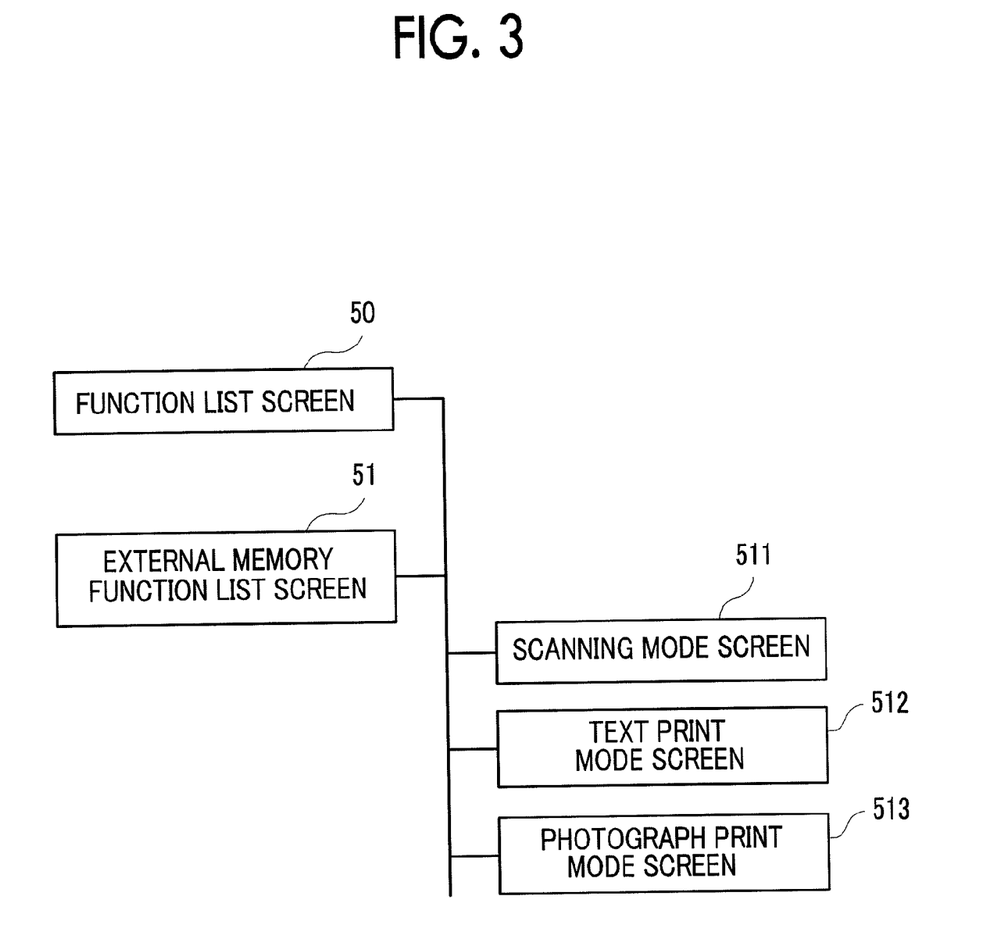
FIG. 3 is a diagram illustrating the hierarchical structure of a display screen according to the exemplary embodiment.

Next, the display screen according to this exemplary embodiment will be described. FIG. 3 is a diagram illustrating the hierarchical structure of the display screen of the image forming apparatus 10. As shown in FIG. 3, in this exemplary embodiment, a function list screen 50 (first list screen) and an external memory function list screen 51 (second list screen) are defined as upper-layer display screens. The function list screen 50 is a menu screen that displays a list of all functions which may be provided to the user by the image forming apparatus 10. The external memory function list screen 51 is a sub-menu screen that displays a list of functions related to the external storage device 20 which is inserted into the I/F 16 among all of the functions.

For example, a scanning mode screen 511, a text print mode screen 512, and a photograph print mode screen 513 are defined as lower-layer display screens. The scanning mode screen 511 is a display screen related to the scanning function of the image reading unit 12 that reads images from the recording medium and is displayed before the image reading unit 12 starts to read the images. The text print mode screen 512 is a display screen related to a text print function of printing a text file and is displayed before the printing of the data of the text file stored in the external storage device 20 starts. The photograph print mode screen 513 is a display screen related to a photograph print function of printing a photograph file and is displayed before the printing of the image data of the photograph file stored in the external storage device 20 starts. The default values of various parameters predetermined for each function are displayed on the display screens.

(Example of Operation)

Figure 4:
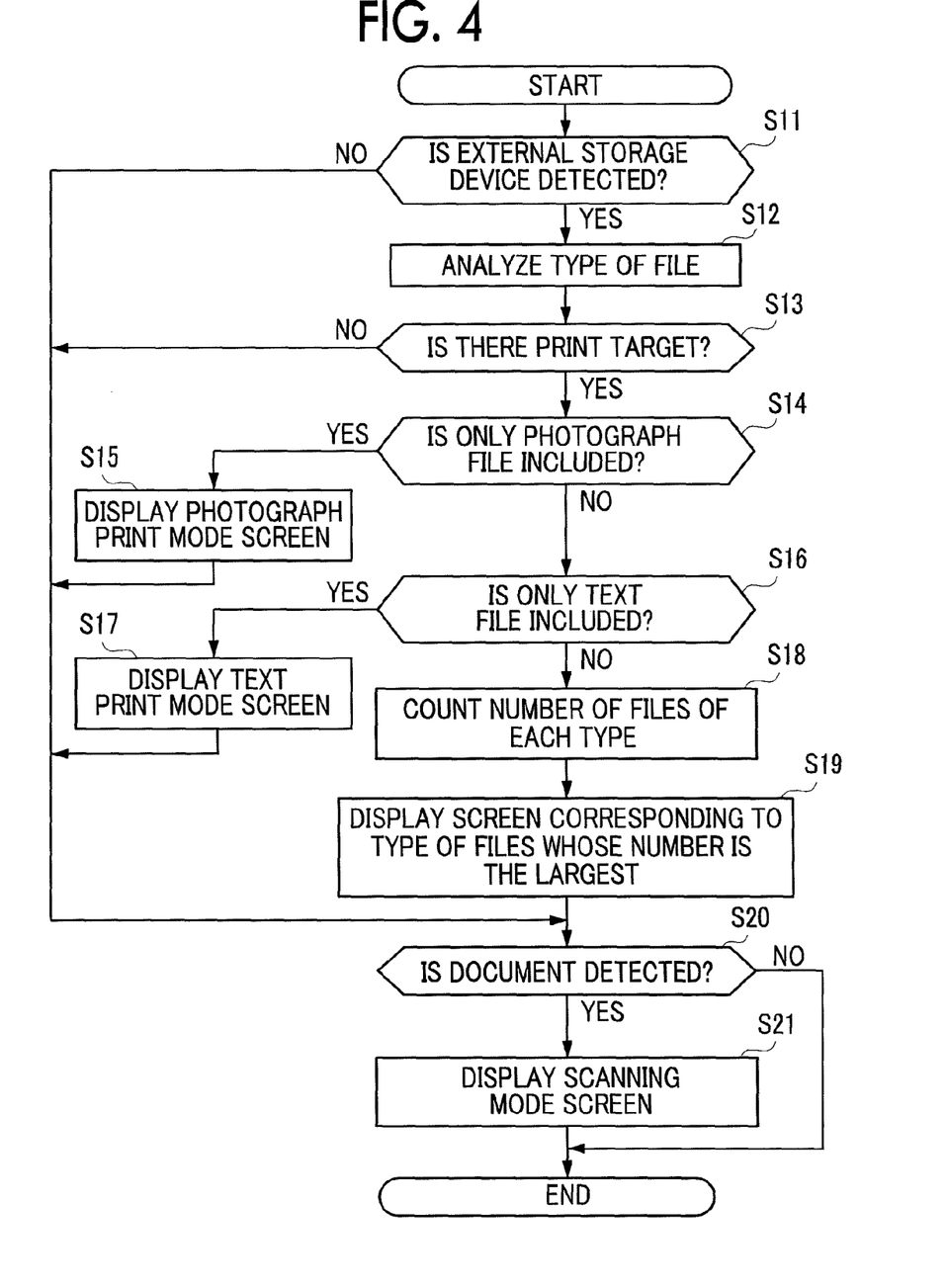
FIG. 4 is a flowchart illustrating the operation of the image forming apparatus according to the exemplary embodiment.

Next, an example of the operation of the image forming apparatus 10 according to this exemplary embodiment will be described. FIG. 4 is a flowchart illustrating the operation of the image forming apparatus 10. When it is detected that the external storage device 20 is inserted into the I/F 16 (Step S11: YES), the control unit 11 analyzes the types of files stored in the external storage device 20 through the I/F 16 (Step S12). When the type of file to be printed is included in the analyzed types of files (Step S13: YES) and only the photograph files are included in the analyzed types of files (Step S14: YES), the control unit 11 displays the photograph print mode screen 513 shown in FIG. 5 on the display unit 15 (Step S15).

Figure 5:
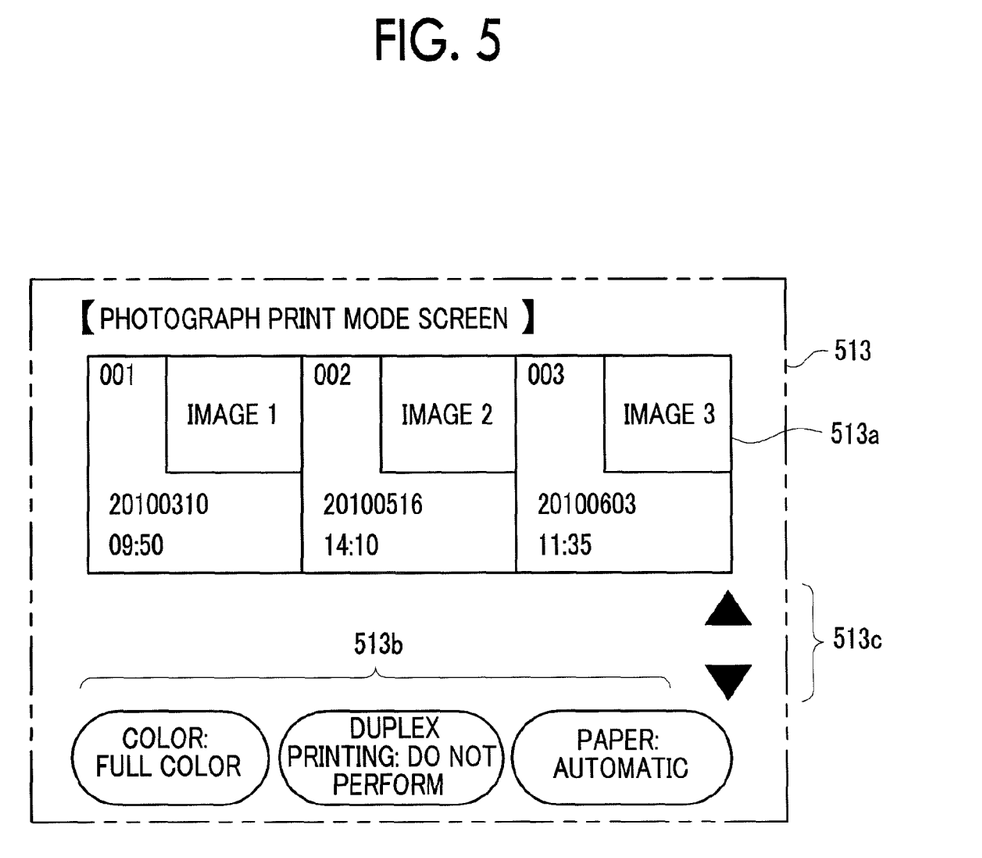
FIG. 5 is a diagram illustrating an example of the display of a photograph print mode screen according to the exemplary embodiment.

As shown in FIG. 5, the photograph print mode screen 513 includes an image 513a that includes thumbnail images (image 1, image 2, and image 3) of each file including the Exif meta data and date and time information (for example, 20100310 09: 50) in the external storage device 20, setting buttons 513b, such as color, duplex printing, and sheet buttons, indicating parameters used to print images, and a scroll button 513c that scrolls the data displayed on the image 513a. "Full color", "do not perform", and "automatic" are set as the set values of the "color", "duplex printing", and "paper" buttons which are displayed as the setting buttons 513b. Each of the setting buttons 513b is pressed to change the set values. In addition, the user may press the display area of each image displayed on the image 513a with fingers to select an image on which the photograph print function will be performed. When an execution button provided in the operating unit 14 is pressed by the user, the image to be executed which is displayed on the image 513a is printed with the displayed set values of the parameters.

Figure 6:
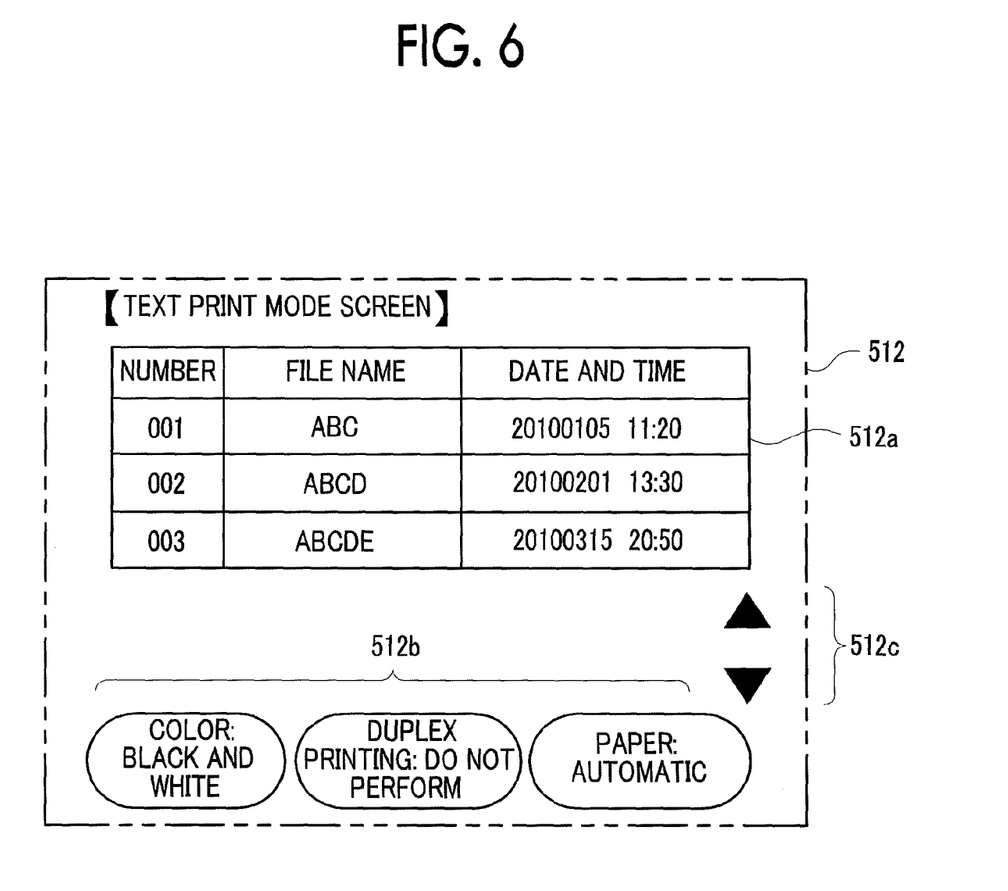
FIG. 6 is a diagram illustrating an example of the display of a text print mode screen according to the exemplary embodiment.

Returning to FIG. 4, in Step S14, when the file types other than photograph files are included (Step S14: NO) and only the text file type is included (Step S16: YES), the control unit 11 displays the text print mode screen 512 shown in FIG. 6 on the display unit 15 (Step S17). As shown in FIG. 6, the text print mode screen 512 includes an image 512a including a number indicating each text file stored in the external storage device 20, a file name, and the date and time, setting buttons 512b, such as color, duplex printing, and sheet buttons indicating parameters, and a scroll button 512c that scrolls data displayed on the image 512a. "Black and white", "do not perform", and "automatic" are set as the set values of the "color", "duplex printing", and "paper" buttons which are displayed as the setting buttons 512b. Each of the setting buttons 512b is pressed to change the set values. In addition, the user may touch the display area of each file displayed on the image 512a with their finger to select a file on which the text print function will be performed. When the execution button provided in the operating unit 14 is pressed by the user, the file to be executed which is displayed on the image 512a is printed with the displayed set values of the parameters.

Returning to FIG. 4, in Step S16, when only the type of text file is not included, that is, when a photograph file and a text file are mixed (Step S16: NO), the control unit 11 counts the number of photograph files and the number of text files in the external storage device 20 through the I/F 16 (Step S18).

The control unit 11 displays a display screen corresponding to a file type with the largest number of files on the display unit 15 (Step S19). That is, when the number of photograph files is more than that of text files, the control unit 11 specifies the photograph print mode screen 513 corresponding to the photograph files as the display screen and displays the photograph print mode screen 513. When the number of text files is more than that of photograph files, the control unit 11 specifies the text print mode screen 512 corresponding to the text files as the display screen and displays the text print mode screen 512.

Figure 7:
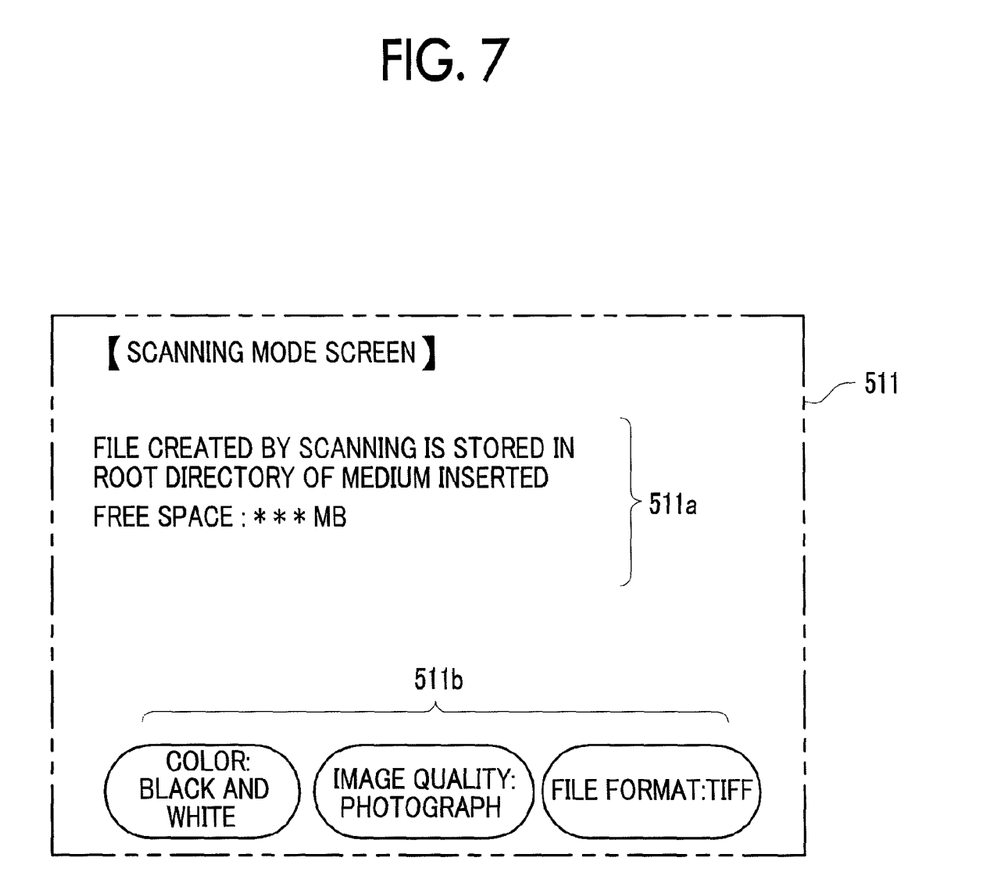
FIG. 7 is a diagram illustrating an example of the display of a scanning mode screen according to the exemplary embodiment.

During the display of the display screen, or in a case in which the external storage device 20 is not detected in Step S11 (Step S11: NO) or the type of file to be printed is not included in Step S13 (Step S13: NO), when it is detected that a document is set on the image reading unit 12 (Step S20: YES), the control unit 11 displays the scanning mode screen 511 shown in FIG. 7 on the display unit 15 (Step S21). As shown in FIG. 7, the scanning mode screen 511 includes an image 511a of a message indicating that the image data file read by the image reading unit 12 is stored in the external storage device 20 and setting buttons 511b, such as color, image quality, and file format buttons indicating parameters used for a scanning function. "White and black", "photograph", and "TIFF" are set as the set values of the "color", "image quality", and "file format" buttons which are displayed as the setting buttons 511b. Each of the setting buttons 511b is pressed to change the set values. In addition, when the user presses the execution button provided in the operating unit 14, the image of the document set on the image reading unit 12 may be read according to the displayed set values of the parameter to generate image data and the image data may be stored in the external storage device 20. In Step S20, when it is not detected that the document is set on the image reading unit 12 (Step S20: NO), the control unit 11 ends the process.

In the above-described exemplary embodiment, the display screen of the function corresponding to the type of files stored in the external storage device 20 which is inserted into the image forming apparatus 10 is displayed. Therefore, the number of operations performed by the user is smaller than that when a menu screen, such as the function list screen 50 or the external memory list screen 51 shown in FIG. 3, is displayed and then the user selects a function to be performed. In addition, when plural types of files are mixed, the display screen is displayed according to the number of files. Therefore, the display screen of the function corresponding to the file types which are frequently used by the user is displayed.

<Modifications>

Next, modifications of the exemplary embodiment of the invention will be described.

Figure 8:
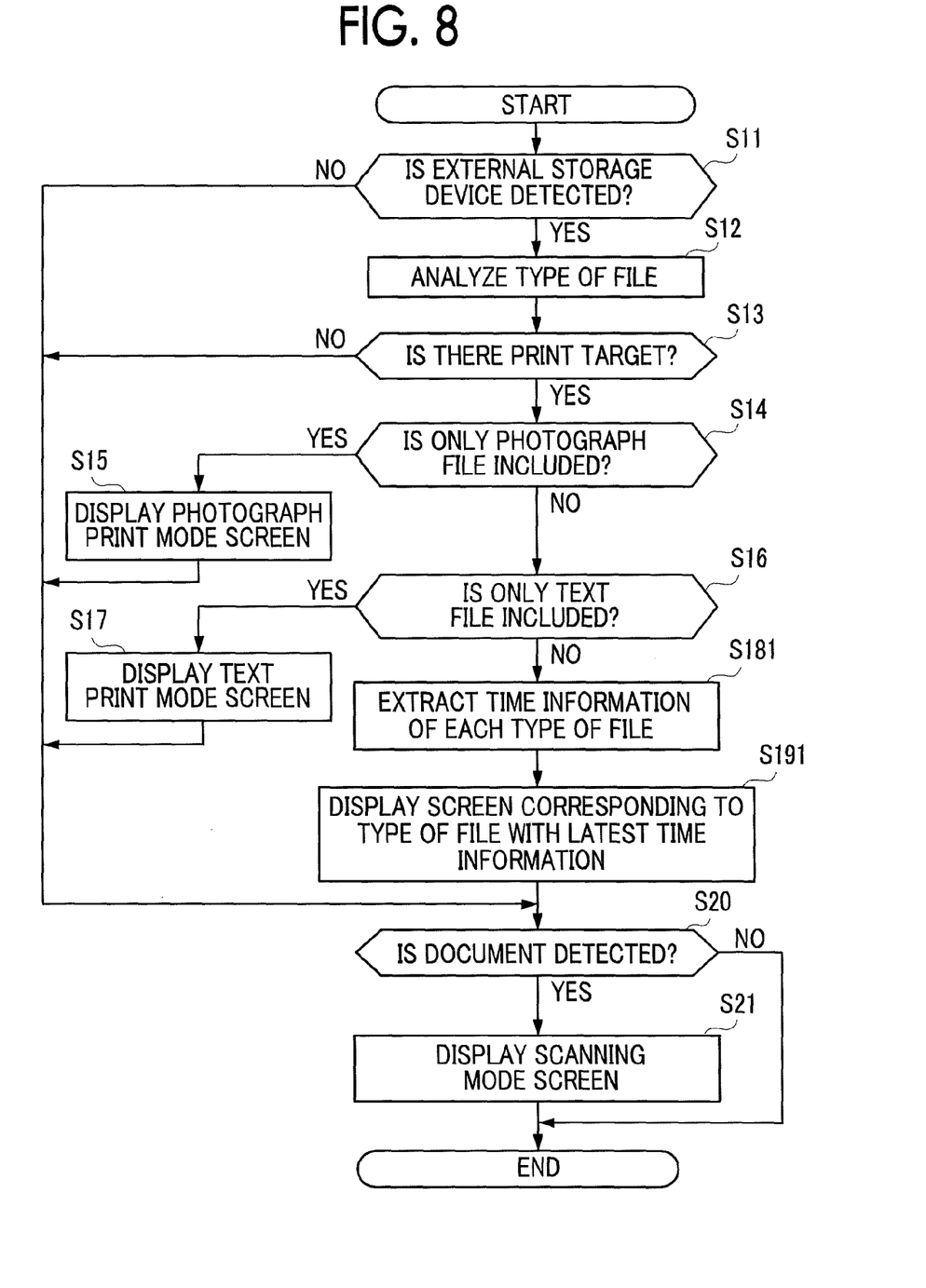
FIG. 8 is a flowchart illustrating the operation of an image forming apparatus according to a first modification.

(1) In the above-described exemplary embodiment, when plural types of files are mixed, the display screen is specified on the basis of the number of files. However, the display screen may be specified on the basis of the time information in the file. For example, when time information about, for example, the date and time when the file is created, the access date and time, and the update date and time, is included in each file, the display screen of the function allocated to the type of file with the latest date and time in the time information may be specified. FIG. 8 is a flowchart illustrating the operation in this case. In FIG. 8, steps other than Step S181 and Step S191 are the same as those shown in FIG. 4. In Step S16, when photograph files and text files are mixed (Step S16: NO), the control unit 11 extracts the time information items of each file in the external storage device 20 through the I/F 16 (Step S181), specifies a file with the latest time information among the extracted time information items, and displays the display screen corresponding to the type of specified file on the display unit 15.

(2) In the above-described exemplary embodiment, when any one of the scanning mode screen 511, the text print mode screen 512, and the photograph print mode screen 513 is displayed and when the user uses the operating unit 14 to input a specific operation, the displayed screen may be changed to the function list screen 50 or the external memory function list screen 51.

Figure 9:
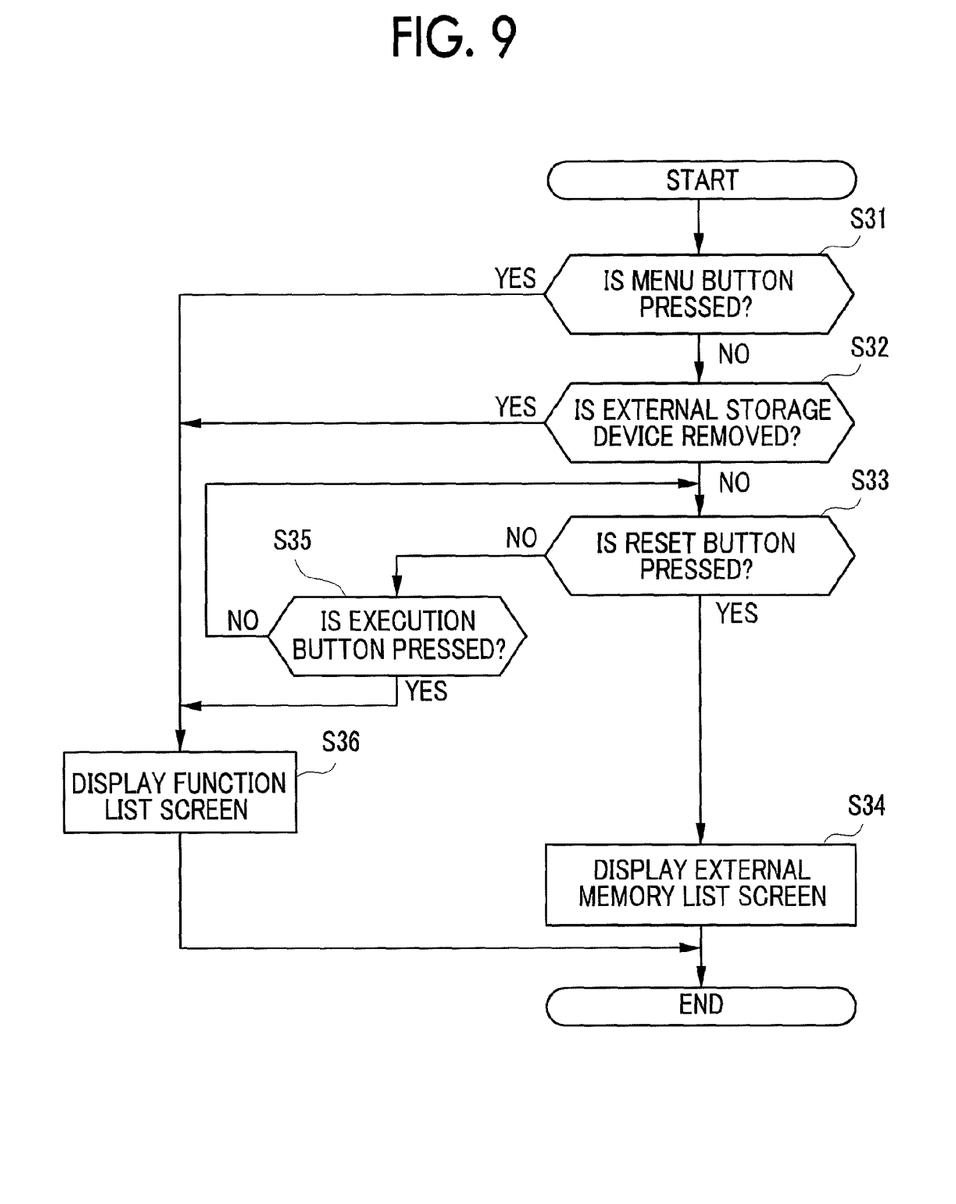
FIG. 9 is a flowchart illustrating the operation of an image forming apparatus according to a second modification.
Figure 10:
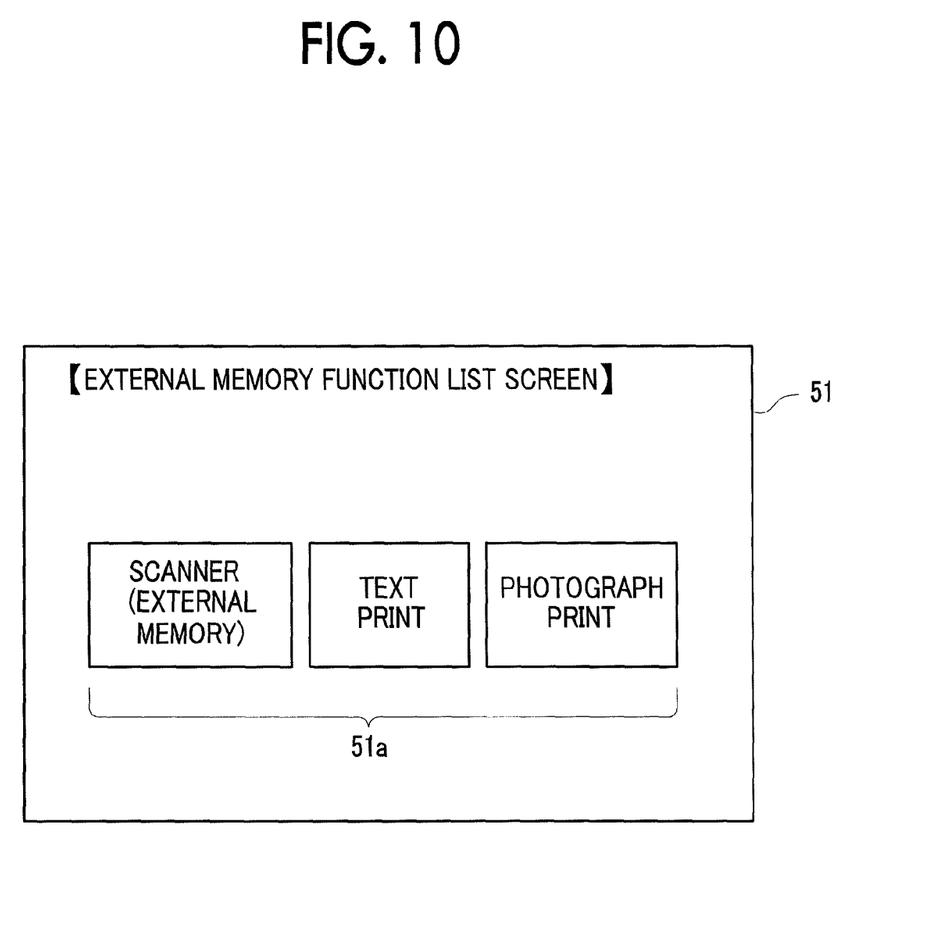
FIG. 10 is a diagram illustrating an example of the display of an external memory function list screen according to the exemplary embodiment.

FIG. 9 shows the flow of the operation in this case. FIG. 9 is a flowchart illustrating a display change process of changing any one of the display screens to the function list screen 50 or the external memory function list screen 51. In a case in which any one of the scanning mode screen 511, the text print mode screen 512, and the photograph print mode screen 513 is displayed on the display unit 15, when the menu button is not pressed with the operating unit 14 (Step S31: NO) and the reset button is pressed with the external storage device 20 inserted into the I/F 16 (Step S32: NO and Step S33: YES), the control unit 11 displays the external memory function list screen 51 shown in FIG. 10 on the display unit 15, instead of the displayed screen (Step S34). As shown in FIG. 10, a list of operation buttons 51a for selecting each function related to the external storage device 20 is displayed on the external memory function list screen 51. A function of reading a document with the image reading unit 12 and storing image data in the external storage device 20 is allocated to a "scanner (external memory)" operation button 51a. When the scanner operation button is pressed, the scanning mode screen 511 is displayed. Functions of printing the text file and the photograph file stored in the external storage device 20 on a sheet are allocated to a text print operation button 51a and a photograph print operation button 51a. When these operation buttons are pressed, the text print mode screen 512 and the photograph print mode screen 513 are displayed.

Figure 11:
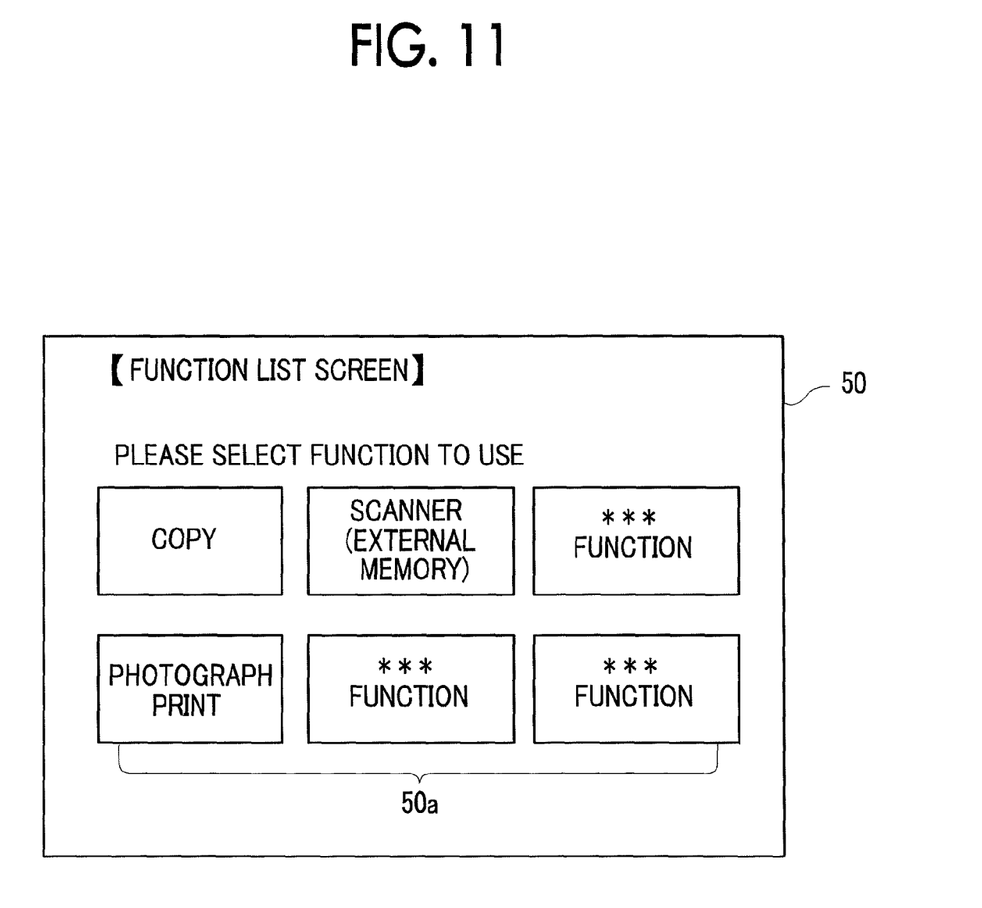
FIG. 11 is a diagram illustrating an example of the display of a function list screen according to the exemplary embodiment.

Returning to FIG. 9, in Step S33, when the reset button is not pressed with the operating unit 14 (Step S33: NO) and the execution button is pressed (Step S35: YES), the control unit 11 displays the function list screen 50 shown in FIG. 11 on the display unit 15, instead of the displayed screen (Step S36). As shown in FIG. 11, a list of operation buttons 50a for selecting all functions (for example, copy, photograph print, and scanner (main body) functions) of the image forming apparatus 10 is displayed on the function list screen 50. When an execution button pressing operation is not received through the operating unit 14 (Step S35: NO), the control unit 11 performs Step S33 and the subsequent process with the display screen being displayed.

When the menu button pressing operation is received through the operating unit 14 (Step S31: YES) or when it is detected that the external storage device 20 is removed from the I/F 16 (Step S32: YES), the control unit 11 proceeds to Step S36 and displays the function list screen 50 on the display unit 15.

(3) In the above-described exemplary embodiment, one interface is provided for inserting the external storage device 20. However, plural interfaces may be provided. In this case, the display screen may be displayed on the basis of the type of files stored in the external storage device 20 which is inserted into the last interface.

(4) In the above-described exemplary embodiment, the set value of each parameter of the setting button 513b displayed on the photograph print mode screen 513 may be set on the basis of imaging information included in the file having the Exif meta data written therein. For example, the value of image quality, such as sharpness, which is adjusted in advance on the basis of the type of camera may be displayed as the set value.

(5) In the above-described exemplary embodiment, there are two types of files, that is, a photograph file and a text file. However, the types of files are not limited thereto. For example, a JPEG or TIFF file in which the Exif meta data is not written may be classified as an image file, and a JPEG or TIFF file in which the Exif meta data is written may be classified as a photograph file. Then, each display screen in which parameters corresponding to each file type are set in advance may be displayed on the display unit 15.

(6) In the above-described exemplary embodiment, the image forming apparatus 10 including the display control device according to the exemplary embodiment of the invention is given as an example. However, the function of the control unit 11 may be given to an external apparatus, such as a PC (Personal Computer) connected to the image forming apparatus 10 wirelessly or by wire, such that the external apparatus functions as a display control device.

(7) In the above-described exemplary embodiment, the program executed by the CPU 11*a* may be stored in a computer-readable recording medium, such as a magnetic recording medium (for example, a magnetic tape or a magnetic disk), an optical recording medium (for example, an optical disc), a magneto-optical recording medium, or a semiconductor memory, and then provided. In addition, the program may be downloaded to the image forming apparatus 10 using a communication unit, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display control device comprising:
   a detecting unit that detects whether an external storage device is inserted into an image forming apparatus;
   an analyzing unit that analyzes the type of file stored in the external storage device when the detecting unit detects that the external storage device is inserted; and
   a display control unit that specifies a function related to the type of file among the functions of the image forming apparatus on the basis of the analysis result of the analyzing unit and displays a display screen to which the specified function is allocated on a display unit,
   wherein the display control unit specifies a first print function related to a first type of file and displays a first display screen corresponding to the first print function in response to the analysis result determining the first type of file stored in the external storage device,
   wherein the display control unit specifies a second print function related to a second type of file and displays a second display screen corresponding to the second print function in response to the analysis result determining the second type of file stored in the external storage device,
   wherein, when a plurality of types of files are analyzed by the analyzing unit, the analyzing unit counts the number of files of each type,
   when a plurality of types of files are analyzed by the analyzing unit, the display control unit specifies the function related to the file type with the largest number of files among the file types which are counted by the analyzing unit and displays the display screen of the specified function on the display unit, and
   when one file type is analyzed, the display control unit displays the display screen of the function allocated to the file type on the display unit.

2. The display control device according to claim 1,
   wherein the file is stored in the external storage device so as to be associated with time information indicating time,
   when a plurality of types of files are analyzed by the analyzing unit, the analyzing unit extracts the time information of each file type,
   when a plurality of types of files are analyzed by the analyzing unit, the display control unit specifies the function related to the latest file type from the time information of each file type which is extracted by the analyzing unit and displays the display screen of the specified function on the display unit, and
   when one file type is analyzed, the display control unit displays the display screen of the function allocated to the file type on the display unit.

3. The display control device according to claim 1, further comprising:
   a recording medium detecting unit that detects whether a recording medium is disposed at an image reading position of an image reading device,
   wherein, when the detecting unit detects that the external storage device is inserted and the recording medium detecting unit detects the recording medium, the display control unit displays a display screen to which a function of storing an image of the recording medium in the external storage device is allocated on the display unit, instead of the display screen of the specified function.

4. The display control device according to claim 3, further comprising:
   an operation receiving unit that receives an operation from a user,
   wherein, during the display of the display screen of the specified function on the display unit, when the operation receiving unit receives an operation of instructing the execution of the specified function, the display control unit displays a first list screen on the display unit such that the user selects any one of the functions of the image forming apparatus, and
   when the operation receiving unit receives a predetermined specific operation, the display control unit displays a second list screen on the display unit such that the user selects any one of functions related to the external storage device.

5. The display control device according to claim 1, further comprising:
   a recording medium detecting unit that detects whether a recording medium is disposed at an image reading position of an image reading device,
   wherein, when the detecting unit detects that the external storage device is inserted and the recording medium detecting unit detects the recording medium, the display control unit displays a display screen to which a function of storing an image of the recording medium in the external storage device is allocated on the display unit, instead of the display screen of the specified function.

6. The display control device according to claim 5, further comprising:
   an operation receiving unit that receives an operation from a user,
   wherein, during the display of the display screen of the specified function on the display unit, when the operation receiving unit receives an operation of instructing the execution of the specified function, the display control unit displays a first list screen on the display unit such that the user selects any one of the functions of the image forming apparatus, and when the operation receiving unit receives a predetermined specific operation, the display control unit displays a second list screen on the display unit such that the user selects any one of functions related to the external storage device.

7. A display control device comprising:

a detecting unit that detects whether an external storage device is inserted into an image forming apparatus;

an analyzing unit that analyzes the type of file stored in the external storage device when the detecting unit detects that the external storage device is inserted; and a display control unit that specifies a function related to the type of file among the functions of the image forming apparatus on the basis of the analysis result of the analyzing unit and displays a display screen to which the specified function is allocated on a display unit, wherein the display control unit specifies a first print function related to a first type of file and displays a first display screen corresponding to the first print function in response to the analysis result determining the first type of file stored in the external storage device, wherein the display control unit specifies a second print function related to a second type of file and displays a second display screen corresponding to the second print function in response to the analysis result determining the second type of file stored in the external storage device, wherein the file is stored in the external storage device so as to be associated with time information indicating time, when a plurality of types of files are analyzed by the analyzing unit, the analyzing unit extracts the time information of each file type, when a plurality of types of files are analyzed by the analyzing unit, the display control unit specifies the function related to the latest file type from the time information of each file type which is extracted by the analyzing unit and displays the display screen of the specified function on the display unit, and when one file type is analyzed, the display control unit displays the display screen of the function allocated to the file type on the display unit.

8. The display control device according to claim 7, further comprising:

a recording medium detecting unit that detects whether a recording medium is disposed at an image reading position of an image reading device, wherein, when the detecting unit detects that the external storage device is inserted and the recording medium detecting unit detects the recording medium, the display control unit displays a display screen to which a function of storing an image of the recording medium in the external storage device is allocated on the display unit, instead of the display screen of the specified function.

9. The display control device according to claim 8, further comprising:

an operation receiving unit that receives an operation from a user, wherein, during the display of the display screen of the specified function on the display unit, when the operation receiving unit receives an operation of instructing the execution of the specified function, the display control unit displays a first list screen on the display unit such that the user selects any one of the functions of the image forming apparatus, and when the operation receiving unit receives a predetermined specific operation, the display control unit displays a second list screen on the display unit such that the user selects any one of functions related to the external storage device.

10. A display control method comprising:

detecting whether an external storage device is inserted into an image forming apparatus;

analyzing the type of file stored in the external storage device when it is detected that the external storage device is inserted; and specifying a function related to the type of file among the functions of the image forming apparatus on the basis of the analysis result and displaying a display screen to which the specified function is allocated on a display unit, wherein a first print function related to a first type of file is specified and a first display screen corresponding to the first print function is displayed in response to the analysis result determining the first type of file stored in the external storage device, wherein a second print function related to a second type of file is specified and a second display screen corresponding to the second print function is displayed in response to the analysis result determining the second type of file stored in the external storage device, wherein, when a plurality of types of files are analyzed by the analyzing, the analyzing comprises counting the number of files of each type, and wherein the specifying comprises:

when a plurality of types of files are analyzed by the analyzing, specifying the function related to the file type with the largest number of files among the file types which are counted by the analyzing and displaying the display screen of the specified function on the display unit, and when one file type is analyzed by the analyzing, displaying the display screen of the function allocated to the file type on the display unit.

* * * * *